May 7, 1929.  L. LEVIEN  1,711,536
ICE BUCKET OR SIMILAR RECEPTACLE
Filed July 7, 1928
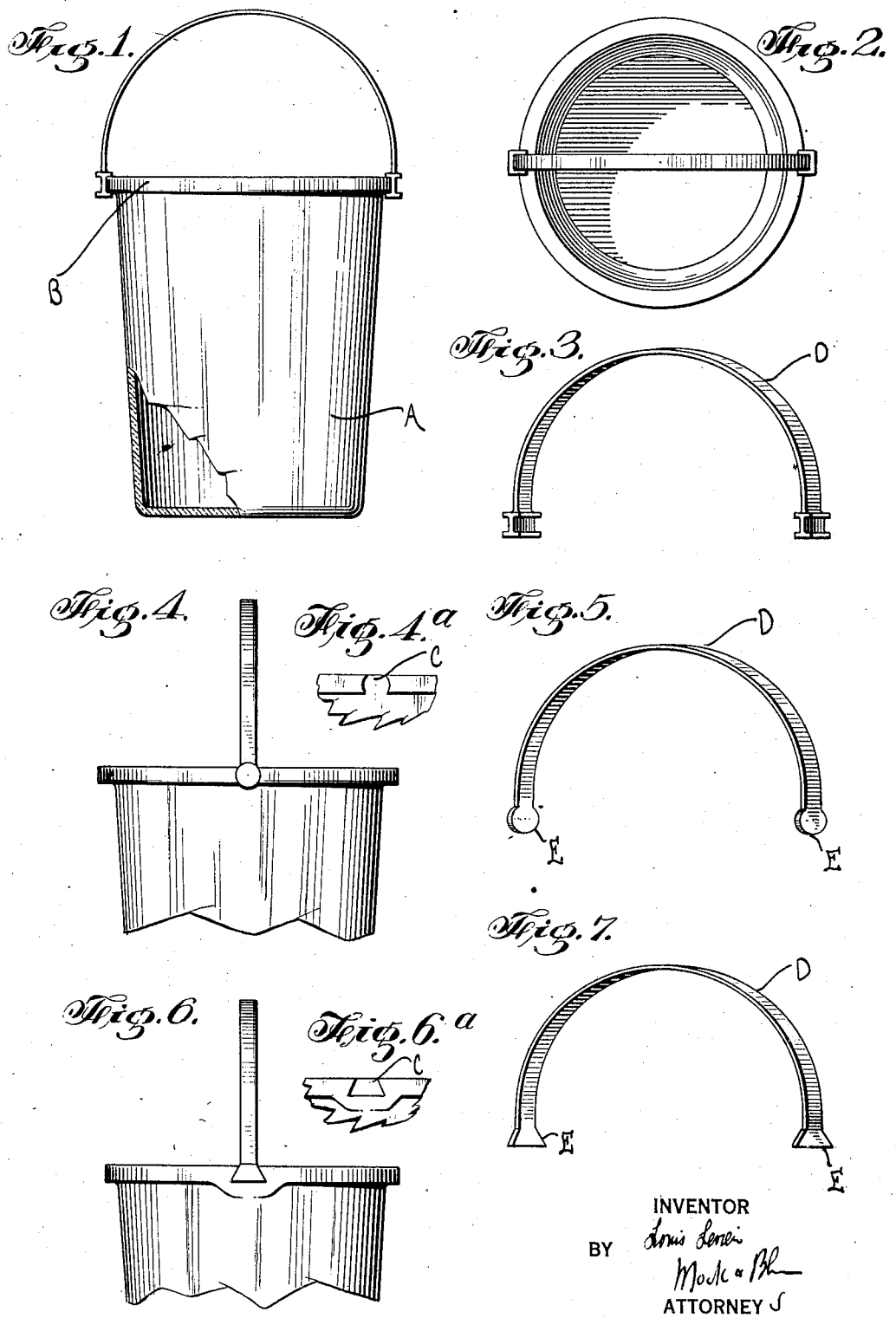

Patented May 7, 1929.

1,711,536

UNITED STATES PATENT OFFICE.

LOUIS LEVIEN, OF NEW YORK, N. Y.

ICE BUCKET OR SIMILAR RECEPTACLE.

Application filed July 7, 1928. Serial No. 290,909.

This invention relates to ice buckets and similar receptacles and more particularly to receptacles made of glass, although it is also applicable to receptacles made of other materials.

A particular object of my invention is the provision of a receptacle made of glass to and from which a handle is quickly attachable and detachable.

Further objects of the invention will be apparent from the specification and drawings in which Fig. 1 is a perspective view of my improved receptacle, with handle attached.

Fig. 2 is a top plan view.

Fig. 3 is a perspective view of the handle detached.

Fig. 4 is a perspective view of another form of handle and receptacle with the lower portion broken away.

Fig. 4ª is an enlarged detail showing the form of flange.

Fig. 5 is a perspective view of the handle shown in receptacle illustrated in Fig. 4.

Fig. 6 shows another modification of my improved receptacle.

Fig. 6ª is an enlarged side view of the flange used on the receptacle shown in Fig. 6.

Fig. 7 is a perspective view of the handle used in Fig. 6.

In designing my improved receptacle, it was my object to produce a receptacle of glass to and from which a handle was readily attachable and detachable and in which the attaching means for the handle were not readily frangible.

I further desired to produce a receptacle in which the handle was securely attached when in use but could be detached with a minimum of effort.

I provided a receptacle with the bottom of ordinary shape A having a flange integral therewith B. On opposite sides of the flange, there are openings or depressions in the same intended to receive the ends of the handle D. The handle D is preferably made of metal, such as steel, having a certain springiness, the ends of the handle E being so fashioned as to snugly fit into the opening C and being so shaped that the ends E cannot be disengaged by an upward or downward vertical movement, it being possible to relieve the handle D from the body A only by horizontal pressure against the handle which is preferably made so as to have normally a tension sufficient to rest securely within the opening C.

Receptacles are now manufactured having buttons on the upper portion or collars of same to which handles with openings therein are attached but I have found that these buttons, especially on glass receptacles, are easily broken. In the arrangement herein described, there is no protuberance of any kind upon the glass except the flange herein mentioned so that the attaching means on the receptacle itself cannot be readily broken. It is apparent that further variations may be made from the form of flange and form of handle without departing from the spirit of my invention.

It is apparent that although for a specific illustration I have shown the device as applied to an ice bucket, that the invention is applicable to all kinds of receptacles such as baskets, trays, etc.

Having fully described my invention, what I claim is:

1. The combination of a receptacle having a circular flange at the top thereof and integral therewith, openings in said flange on opposite sides of said receptacle, said openings being of greater width at the bottom than at the top, and a spring handle for said receptacle having ends fitting in said openings, the ends of said handle being shaped so as to prevent any vertical movement of said ends against said flange and so as to prevent normally the displacement of the ends of said handle from said openings.

2. In combination, a receptacle having a circular flange at the top thereof and integral therewith, openings in said flange on opposite sides thereof, said openings tapering downwardly, and a spring handle for said receptacle having ends fitting in said openings so that normally the ends of said handle will be held against any vertical movement in said openings.

In testimony whereof I affix my signature.

LOUIS LEVIEN.